United States Patent
Yuratich

(10) Patent No.: US 10,837,268 B2
(45) Date of Patent: Nov. 17, 2020

(54) METHODS AND APPARATUS FOR PRODUCING FLUIDS FROM A WELL

(71) Applicant: Michael Yuratich, Hampshire (GB)

(72) Inventor: Michael Yuratich, Hampshire (GB)

(73) Assignee: Magenetic Pumping Solutions, Hampshire (GB)

( * ) Notice: Subject to any disclaimer, the term of this patent is extended or adjusted under 35 U.S.C. 154(b) by 0 days.

(21) Appl. No.: 15/356,167

(22) Filed: Nov. 18, 2016

(65) Prior Publication Data

US 2018/0142541 A1    May 24, 2018

(51) Int. Cl.
*E21B 43/12* (2006.01)

(52) U.S. Cl.
CPC .................................. *E21B 43/128* (2013.01)

(58) Field of Classification Search
CPC ..................................................... E21B 43/128
See application file for complete search history.

(56) References Cited

U.S. PATENT DOCUMENTS

| | | | | |
|---|---|---|---|---|
| 5,845,709 | A | * | 12/1998 | Mack .................... E21B 43/128 166/302 |
| 2008/0236821 | A1 | * | 10/2008 | Fielder .................. E21B 43/128 166/265 |
| 2016/0319607 | A1 | * | 11/2016 | Maclean ............... E21B 17/003 |

* cited by examiner

*Primary Examiner* — D. Andrews
(74) *Attorney, Agent, or Firm* — Matthew J Patterson

(57) ABSTRACT

Permanent magnet motor (PMM) powered artificial lift apparatus and methods of practicing the same. The PMM artificial lift apparatus provides a method for the use of permanent magnet motors below perforations, and which may also be used in conditions of low flow rate or extremely high viscosity above perforations without any active cooling schemes.

5 Claims, 7 Drawing Sheets

METHODS AND APPARATUS FOR PRODUCING FLUIDS FROM A WELL

BACKGROUND OF THE INVENTION

Field of the Invention

The present invention relates to artificial lift systems used to pump fluids from wells and, and more particularly, to positioning such artificial lift systems below the perforations.

Description of the Related Art

Hydrocarbon reservoirs produce fluid from boreholes drilled therein when the reservoir pressure is greater than the flowing pressure at the point of entry to the borehole necessary to lift the fluid to surface. In many wells there is never sufficient reservoir pressure for natural production. In all wells the pressure will eventually be insufficient. The pressure, even if sufficient for production, may not meet the owner's requirements for rate of production.

Therefore at some point in its life a conventional hydrocarbon reservoir is typically subjected to methods which increase the reservoir pressure to improve, sustain or maximise ultimate production volume. Enhanced oil recovery (EOR) methods include the injection of water into nearby wells to displace reservoir fluid towards the producing well.

In addition, or alternatively, in-well artificial lift methods may be used. Gas lift uses surface pumps to inject gas into the well bore, which reduces the density of produced fluids, so that the flowing pressure becomes sufficient for production to surface.

Downhole pump methods boost the flowing pressure so that the fluids reach the surface. The production rate may be increased by reducing the flowing pressure further below reservoir pressure, requiring additional boost from the pump.

There exist many known types of downhole pumps. Such pumps may be actuated mechanically from surface using reciprocating rods such as in the case of beam type pumps. Other pumps may be actuated from the surface by rotating rods as in the case of progressive cavity pumps. Still other pumps may be actuated from the surface by hydraulic liquid such as in the case of jet pumps and turbines.

Other types of pumps may be operated downhole, in situ, using electric motors, a method generally known as electric submersible pumping (ESP). ESP's are well known in the industry and are well-explained in the SPE Handbook and its online version petrowiki.com. The generally accepted term "ESP" is directed towards electric motors that are attached to and rotate centrifugal pumps, generally in the speed range of a few thousand revolutions per minute. As will be described more fully herein after, various types of electric motors and pumps may be used downhole in conjunction with ESP systems. For example, the aforementioned progressive cavity pump rotated by rods from surface becomes an ESP when it is rotated by a directly attached electric motor (which rotates at about 100-300 rpm, typical of this type of pump). Another example is the aforementioned beam pump which may be a reciprocating piston pump operated by rods connected to the surface actuator. The same reciprocating piston pump may be operated by a downhole linear reciprocating motor or rotating motor with a rotation to reciprocation transmission.

Once a well bore is drilled within an earth formation, the borehole is completed by first lining it with a reinforcing casing to prevent its collapse and to seal off the earth formation. The casing may be made of overlapping successively smaller diameter sections, and is cemented into the well bore. Openings are made in the casing opposite the hydrocarbon reservoir of interest. These openings are usually in the form of perforations but can also be manufactured with control valves for selective operation. The pumping system is installed within the wellbore and in proximity to the perforations as will be explained more fully hereinafter.

It is generally understood in the industry that the term "unconventional well" refers to a well that produces from shale rather than sand and/or limestone reservoirs. The porosity in the shale contains gas and oil which of itself is not producible due to lack of permeability to flow. This is typically overcome by the process of hydraulic fracturing in which the pressure in the well bore is raised sufficiently to fracture the shale. Solids, known as proppant, are pumped in and enter the fractures. When the excess pressure is removed, the proppant keeps the fractures open leaving artificial permeability, and production may occur. The high pressures used in fracturing place a great strain on the casing, and therefore the casing of such an unconventional well is thicker wall than used in conventional wells. Since the shale has a low porosity and hence low fluid content in a given volume compared to a conventional reservoir, the wells are generally drilled laterally over long distances through the shale beds. As can be appreciated by those skilled in the art, the expense of this process dictates that relatively small diameter boreholes are drilled. In the United States, the majority of such wells are drilled and completed with 5.5 inch diameter, 17 ppf casing, leaving an internal diameter of 4.892 inches. The nominal clearance for the deployment of artificial lift equipment typically includes 0.125 inches of drift leaving a "working" inside diameter of about 4.77 inches. This relatively small internal clearance makes it difficult to design and deploy ESP systems having sufficient power and cooling capabilities.

As will be explained more fully herein below, and as is known in the art, ESP motors rely on production fluids to cool the motor. Many such motors are induction type motors with a need for high rates of cooling. A typical rule of thumb is a requirement for 1 foot/second of production fluid flow velocity over the motor housing, where there is substantial water content in the production fluid, and is associated with turbulent flow. For this reason ESP motors of the prior art position the motor such that production fluids are purposefully directed past the motor, primarily by the pump, using well known arrangements.

Other methods of cooling prior art motors include circulating tubes filled with a cooling fluid that extend along the side of the housing of the motor. The circulating tubes in are in fluid communication with the lubricant oil, within the motor housing. In some cases the motor oil itself is circulated within the circulating tubes. The circulating tubes are further in fluid communication with the borehole fluids and facilitate heat transfer from the motor oil to surrounding borehole fluid. In all such heat exchangers, the fluid is purposefully and actively pumped within the circulating tubes. One such method is set forth in U.S. Pat. No. 9,109,609, the disclosure of which is incorporated by reference herein in its entirety. Still other active cooling schemes exist in the prior art including refrigerant based systems such as those set forth in United States Patent Application No 20150139822, the disclosure of which is incorporated by reference herein in its entirety Referring to FIG. 1, there is shown a representative completion 1 for an ESP of the prior art showing a typical scheme for providing sufficient cooling to the motor 11. The motor 11, which may typically comprise an induction type motor, is positioned below the pump 12 and attached thereto by a seal 16. The seal 16, which may include a coupling or other power transmission device, separates borehole fluid 9 from the clean internal fluid (not shown) within the motor. Typically seal 16 also usually provides pressure balancing and volume compensation as the internal fluid expands and contracts with temperature and pressure. A rotary shaft 21 runs through seal 16 connecting the motor 11 and pump 12. As is known in the art, pump 12 intakes fluid near its downhole end through intake 20 and discharges it into production tubing 15 at a pressure sufficient to bring the fluid to surface. The fluid is discharged from pump 12 into production tubing 15, and the tubing itself acts as a support for the pump and motor assembly 10. The tubing 15 runs back to the well-head and surface collection facilities (not shown). The pump assembly 10 is shown merely as an example and other configurations and arrangements of pumps, motors and seals are known in the industry.

In steady production, the flowing pressure at the perforations 8 is equal to the static pressure of the fluid column above the perforations in the casing. The greater the height of this column, the higher the flowing pressure. As described herein above, and still referring to FIG. 1, the pump and motor assembly 10 of the prior art are positioned above the perforations 8. Production fluid 9 moves upwards from the perforations 8 to the intake 20 at the downhole end of pump 12. It is well known in the industry that torpid production fluids 22 in the portion of the well below the perforations 8 are torpid, or stagnant, with little or no naturally occurring flow. Except for extra heavy crude and for very low water-cut oil, gravity separation ensures the torpid production fluids 22 in the portion of the well bore below the perforations is comprised mostly of water. For a centrifugal type pump, the fluid level in the casing must be sufficiently above the intake 20 in order to meets its minimum suction pressure requirements. For a progressive cavity pump, the fluid level can be even with the intake 20, but in all cases a practical margin of safety is added since running the pump dry (pump off) will cause damage. In such an arrangement production fluid is purposefully drawn past motor 11 by pump 12 before entering intake 20.

Since the production fluid 9 level is at or above the pump intake 20, the further above the perforations 8 that the pump 12 is positioned, the higher the static fluid column in the casing 3 and hence higher the flowing pressure. As can be appreciated by those skilled in the art, the higher the static column of production fluid 9 above the perforations 8 the lower the production rate.

Now referring to FIG. 2, there is shown a prior art representation of a motor and pump assembly 10 positioned below perforations 8 and another typical cooling scheme for the motor 11. Operating ESPs below the perforations advantageously allows the fluid column to be reduced to the level of the upper perforations, and hence to the lowest possible flowing pressure. This offers multiple advantages and in some cases can change field production feasibility. As described immediately herein above, minimizing flowing pressure maximizes production rate. Placing the pump 12 below perforations 8 also reduces gas interference with pump performance, since gas rises and separates naturally from the liquid drawn downwards to the pump intake 20. In placing the pump assembly 10 of FIG. 1 below the perforations 8, the fluid 9 below the pump inlet 20 is substantially torpid (or stagnant) as no natural flow occurs there. It is known that ESPs of the prior art have been always installed either above the perforations (as in FIG. 1) or if installed below the perforations 8, or in sections of the well where the fluid is substantially stagnant, the motor must be actively cooled by diverting production fluid over the motor or using other known active cooling schemes, including those described herein above.

As described herein before, placing the motor 11 and pump 12 below perforations 8 allows production to be maximized since the fluid level in the casing may be reduced to the lowest producing perforation. Cooling of the motor 11 in FIG. 1 takes place by two mechanisms—forced convection of fluid as it drawn or directed past the motor. However, as described herein above, it is known that the fluid below perforations is stagnant, and with the motor positioned below the pump there is no forced convection cooling from production flow passing over the motor. In order to overcome this lack of cooling in the prior art, and still referring to FIG. 2, motor and pump assembly 10 further include a shroud 23 surrounding motor 11, seal 16 and pump 12. It will be appreciated by those skilled in the art that, in the embodiment shown, production fluid 9 is diverted around shroud 23 and enters through the open downhole end thereof and is drawn past motor 11 to enter pump 12. Shrouds are known in the art and an exemplary shroud is set forth in U.S. Pat. No. 8,459,362, the disclosure of which is incorporated by reference herein in its entirety. The shroud 23 diverts production fluid 9 and cools the motor 11. It is known that problems occur in the use of such shrouds in that the shrouds restrict the area around the pump and they may plug, for example with entrained solids or build-up of scale. The use of a shroud also dictates that smaller diameter motors be used which make the motor section longer and in many times less reliable. Other known devices such as circulating tubes are also used, wherein a portion of production fluid from the pump discharge is directed down past the motor using one or more conduits and returns up past the motor to cool it. This adds complexity to the equipment configurations and negatively affect performance and run-life in many cases, due to plugging with entrained solids and scale. In addition, devices such as shrouds and tubes are readily damaged during installation, and may hang up in the casing string preventing or expensively prolonging the installation.

Most prior art motors used to drive ESPs have been of the three-phase asynchronous squirrel cage induction type. This type of motor dominates general industry and has been used since the inception of ESPs in the 1930s. The operation of such three-phase asynchronous squirrel cage induction type motors is very well known in the prior art. It is well known that an induction motor operates by inducing magnetic poles on its rotor through transformer action between the rotor winding (squirrel cage) and the stator winding fixed in the motor housing. The three-phase currents in the stator cause a rotating field which acts on the rotor poles to cause synchronous rotation. The shaft rotates at a lesser speed; the electrical frequency of the transformer action is based on the difference in shaft and synchronous speeds.

A typical electric induction motor used in submersible pumping is well known in the art. The motor has a shaft that runs the length of the motor. Rotor elements are slipped onto and keyed to the shaft. ESP motors typically have many rotor elements, which are generally referred to simply as rotors, whereas all the rotor elements fitted to the shaft are collectively referred to as the shaft assembly. In motors having such multiple rotor elements, the rotor elements may alternate with bearings mounted to the shaft. A wound stator installed into the motor housing runs the length of the rotor-bearing assembly. The motor is oil-filled and at a pressure that it is essentially at the same pressure internally as the surrounding borehole fluid. Each rotor element comprises a stack of annular electrical steel laminations, clamped together by copper end rings. These rings are typically crimped to copper bars running through the laminations (the squirrel cage). The rotor laminations are customarily pressed simultaneously with the stator laminations, from the same sheet of electrical steel.

In operation, the stator windings of the typical induction motor carries an electrical current made up of components in phase and in quadrature to the applied phase voltage. The quadrature current is almost entirely comprised of the magnetizing current $I_m$, which is the current that induces current in the rotor winding and hence creates the rotor poles. With reference to FIG. 3, this magnetizing current 101 is essentially constant through the motor load range. The in-phase current 100 is the productive torque-producing current $I_t$. The measured phase current 102, a characteristic known in induction motors, is approximately equal to the square root of the sum of squares of the magnetizing and torque currents:

$$I=\sqrt{I_m^2+I_t^2} \qquad \text{Equation 1}$$

Induction motors have many inherent sources of power loss that produce heat. Since copper has electrical resistance, both the rotor and stator (comprised at least in part of copper) generate power losses, in the form of heat, due to their respective currents. It is known that this heating will increase with temperature since copper resistance values increase with an increase in temperature. Heat generated in the rotor transfers across the rotor/stator annular gap. The friction generated by the rotor turning in the oil within this gap also generates heat. These sources of heat mainly escape from the motor by conducting through the stator. They therefore raise the temperature in the stator windings beyond the rise attributable to their own resistive losses. In addition, the oil itself is subject to high temperature and the deleterious effects thereon. In addition, the rotating magnetic fields induce significant hysteresis and eddy current losses within the laminations.

The magnetizing current in a typical three-phase asynchronous squirrel cage induction type is typically on the order of 30% to 50% of motor rated current. Even when such a motor is run in air on a bench with no load, significant heating losses due to this current, and to friction, will arise and cause the motor temperature to increase rapidly. The typical induction motor cannot be run on a bench at room temperature (without cooling) for more than an hour without risk of damage from overheating and fifteen minutes is a typical time limit for testing.

What is needed is a well fluid pumping system that is capable of being positioned below the perforations to take advantage of the aforementioned production benefits, and wherein the motor of such a system may be passively cooled in portion of the well where the fluids are torpid.

SUMMARY OF THE INVENTION

In accordance with some aspects of the present disclosure, systems and methods related to a novel artificial lift system are disclosed.

Various embodiments of an artificial lift system incorporating a permanent magnet motor in a high temperature portion of a well having little or no flow of production fluids and no active cooling are disclosed.

In some aspects of the present invention, the artificial lift system includes a permanent magnet motor as part of an electric submersible pumping system. The permanent magnet motor is positioned in a section of the well where the production fluid is torpid, stagnant, or has low flow and the motor relies solely on passive convective cooling. The passive convective cooling is established by heat transfer from the motor to the torpid fluid near, or in contact with, the motor and heat dissipation to torpid fluids near the casing.

In still other aspects of the present invention, the physical characteristics of the permanent magnet motor are defined by the interaction between the length, diameter, and output of the motor, given the casing size to optimize the passive convective cooling.

In yet other aspects of the present invention a method of providing an artificial lift system include positioning a permanent magnet motor below the perforations of a well and passively cooling the motor with the torpid fluid that exists below the perforations.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following detailed description of the embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure.

The examples disclosed herein relate to permanent magnet motor (PMM) powered artificial lift apparatus and methods of practicing the same. The PMM artificial lift apparatus of the present invention takes advantage of newly discovered aspects of such motors. The present invention provides a method for the use of permanent magnet motors below perforations, and which may also be used in conditions of low flow rate or extremely high viscosity above perforations. The present invention also includes the use of a PMM positioned within, or proximate, the depth range of perforations. It is commonly the case that the specific producing perforations in this range are unknown, so there is a risk that the motor may be placed below the lowest active perforation, equivalent to being set below perforations.

Figure 3:
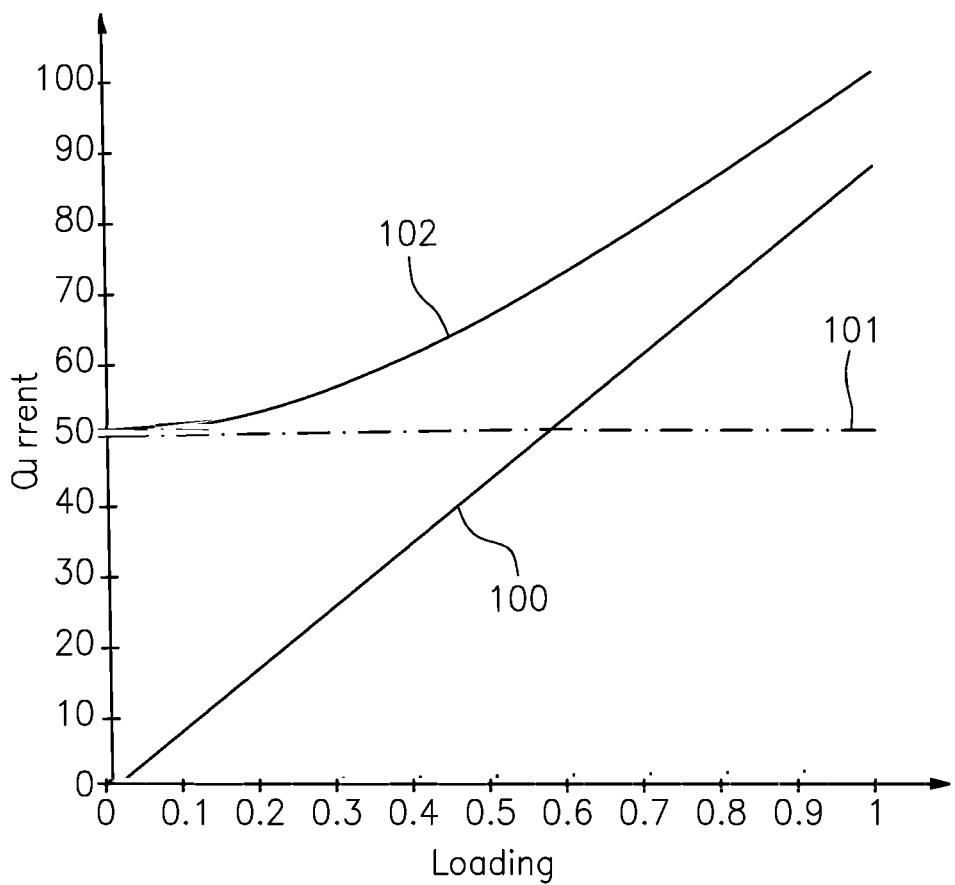
FIG. 3 is a graphical illustration of motor current versus load.

It is known that in a typical permanent magnet motor the rotors carry permanent magnets providing radial flux across the rotor/stator annular gap. The key benefit of such permanent magnets is best illustrated with reference to FIG. 3 where it is shown that, unlike an induction motor, no magnetizing current 101 is required since the rotors are self-energized. The use of permanent magnets in such a way immediately reduces the copper losses in the motor by about 50% compared to an induction motor as described herein above. By way of further contrast to induction motors, all of the stator current in a PMM is used to produce torque and so generally follows curve 100. It is known by those skilled in the art that such submersible permanent magnet motors may develop a rated torque of over twice that of the comparably-sized induction motor, and at higher efficiency. Submersible permanent magnet motors are available from suppliers such as Magnetic Pumping Solutions (website: magneticpumpingsolutions.com) and Borets (website: borets.com).

It is also known that permanent magnet motors may also comprise linear motors, axial flux motors and transverse flux motors for use in downhole artificial pumping systems such as those described herein above. In all such cases, the use of permanent magnet motors result in higher torque density and efficiency than a comparable induction motors in terms of physical size (diameter and length). In general, it is known that the high cost of permanent magnet materials is partially offset by the ability to make motors of smaller physical size, which require less material, including expensive copper, of the same torque as induction motor equivalents.

It has been discovered that, in addition to the foregoing advantages of permanent magnet motors, the heat producing properties of the PMM may be exploited by the current invention. This point may best be illustrated by reference to the following generalized example of a motor installed in a wellbore. An induction motor having a length of 16 feet may produce about 300 kW shaft power at a running speed of 3600 rpm. Assuming that it operates at 80% efficiency, the motor dissipates about 75 kW of heat into the surrounding well bore at about 4.7 kW/ft. A permanent magnet motor of 8 feet in length would produce the same shaft power and speed, but would operate at about 90% efficiency. Such a permanent magnet motor would dissipate about 33 kW of heat, or about 4.2 kW/ft. In this example, and assuming the two motors were positioned in the same operating environment, the temperature rise of the motor housings above of the surrounding borehole fluid will be comparable as they have similar heat dissipation per unit surface area. The internal temperature of the stator winding will nevertheless be lower in the permanent magnet motor since there is negligible heat being conducted from the rotor through the stator.

The present invention takes advantage of these newly discovered attributes of permanent magnet motors related to scaling, in both length and diameter, and the beneficial effects of heat loss related thereto. The advantages of the present invention can be described by starting with the following relation. Beginning with a motor rating for conventionally cooled applications described herein above, the rated motor current $I_n$ will correspond to a certain torque and corresponding internal temperature rise. For an induction motor, the current producing rated torque $I_{nt}$ follows from Equation 1 as:

$$I_{nt} = \sqrt{I_n^2 - I_m^2} \quad \text{Equation 2}$$

Assuming, for illustrative purposes, that the magnetizing current is a typical 35% of the rated current, which is conveniently approximated by $\frac{1}{2}\sqrt{2}I_m$ then:

$$I_{nt} = \sqrt{\frac{7}{8}} I_n \quad \text{Equation 3}$$

Suppose now the active part (stator and rotor) of the motor is changed in length by a factor of k. For instance, if k=2, the active part of the motor will be twice as long. For the same torque as the original motor rated torque, the torque-producing current will be reduced by the factor k. The motor current for an induction motor becomes:

$$I = I_n \sqrt{\frac{1 + 7/k^2}{8}} \quad \text{(Induction)} \quad \text{Equation 4}$$

It should be recognized by those skilled in the art that as the motor length increases, the torque-producing current in an induction motor continues to decrease, but the magnetizing current is unchanged.

As discussed herein above, in a permanent magnet motor there is no magnetizing current. The motor current is the same as the torque producing current, and for the same rated torque the motor current reduces inversely with a k change in length:

$$I = \frac{I_n}{k} \quad \text{(Permanent magnet)} \quad \text{Equation 5}$$

In each case the power lost in the motor per unit length due to heating of the windings (copper loss) is proportional to the square of the current:

$$\left(\frac{I}{I_n}\right)^2 = \frac{1}{8}(1 + 7/k^2) \quad \text{(Induction)} \quad \text{Equation 6}$$

$$\left(\frac{I}{I_n}\right)^2 = \frac{1}{k^2} \quad \text{(Permanent magnet)} \quad \text{Equation 7}$$

In the forgoing the actual rated current in each motor is not material to the argument of Equations 6 and 7, it may be different and will vary with factors such as the number of turns in the specific motor.

This aspect of the present invention is best illustrated with reference to FIG. 4 that compares induction motor installations with PMM installations of the present invention. The lines in the figure show winding loss per unit length referenced to the corresponding base motor (k=1) at rated torque for an induction motor 110 and PMM 111. The induction motor base length is 1 unit. The permanent magnet motor base length is ½ unit, reflecting its typical size at the same rated conditions as described herein above.

Figure 4:
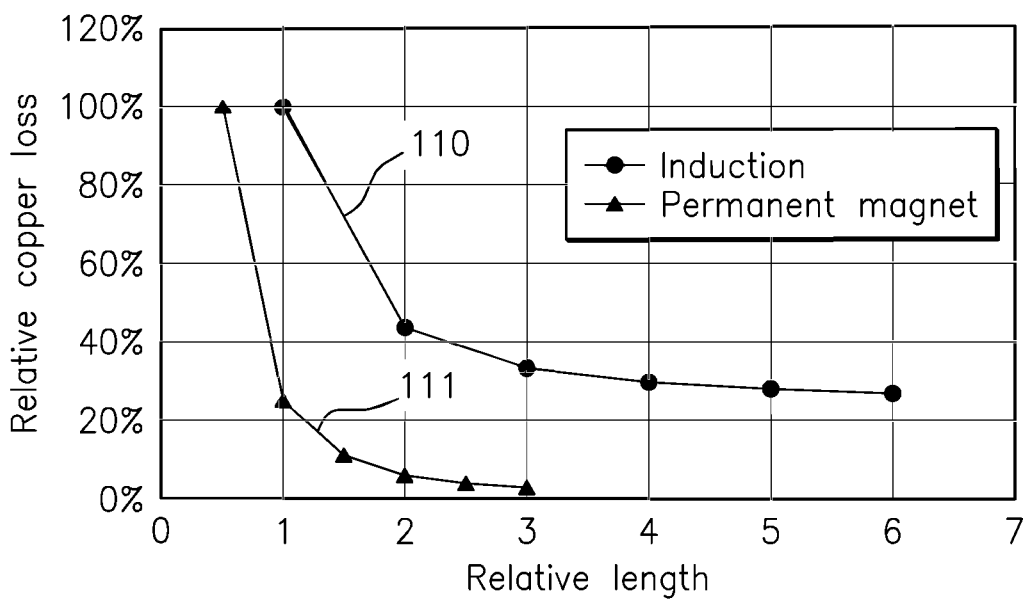
FIG. 4 is a graphical representation of relative copper loss versus relative length.

As shown in FIG. 4 by line 111, if the induction motor is doubled in length, its winding loss drops to 34%, and if tripled in length it falls to 22%. In contrast, the permanent magnet winding loss if doubled in length falls to 25% and yet is still only the same length as the original induction motor of base length of 1. When the PMM is tripled in length, still less than the double length induction motor, the loss falls to 11%. It is an important aspect of the present invention that the reduction in copper loss is directly related to a drop in the operating temperature of the permanent magnet motor. As will be explained more fully herein after, this discovery makes it possible to scale the length of a PMM to accommodate the positioning of the motor in substantially torpid, or low/stagnant flow, areas of the borehole. In addition, and as discussed herein above, in practical terms, doubling and tripling the length of an induction motor can lead to great concerns over reliability and practicality (actually installing the long motor in the borehole), whereas doing the same for a permanent magnet motor is quite acceptable as the lengths remain modest by industry standards. By way of example, and as will explained more fully herein below, for (relatively) small 3.75 inch diameter motors used in a 5.5 inch diameter heavy-wall casing typical of unconventional wells, the contrast is stark: a 90 HP rated induction motor may be 30 feet in overall length, compared to 11.4 feet for the corresponding permanent magnet motor, or an approximate 3:1 advantage.

Figure 5:
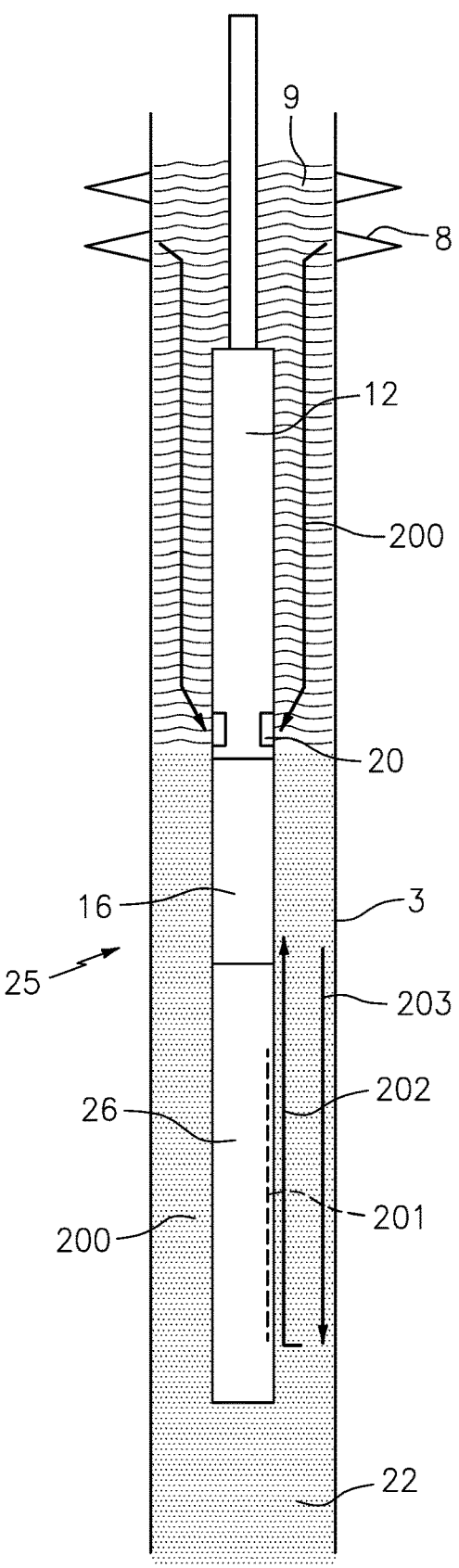
FIG. 5 is a schematic representation of an artificial lift system of an embodiment of the present invention.

Referring now to FIG. 5, there is shown a representation of a PMM pumping system 25 in accordance with the present invention wherein the PMM pumping system is installed below the perforations 8 and PMM 26 positioned within torpid, or stagnant, fluid 22. Heretofore, and as described herein above, motors of the prior art positioned as shown require active cooling to survive the high temperatures in otherwise stagnant fluids 22. It has been discovered that the interaction between the length, diameter, and output of a PMM, given the casing size, yields a novel PMM that requires no active cooling when deployed in stagnant fluids 22. Referring still to FIG. 5, the natural convection flows 202, 203 of stagnant fluid 22 surrounding motor 26 in annulus 200 formed between casing 3 and the motor is shown for a motor stationed below active perforations 8. Production fluid 9 is drawn from perforations 8 down past the pump into pump intake 20 represented by flow lines 200. As described herein above, heavier fluid within the production fluid 9, typically comprised mainly of water, will naturally separate and sink below the intake 20. As discussed directly herein above, torpid fluid 22 in the sump region below the motor 26 is essentially stagnant. The flow of fluid entering the pump represented by lines 200 will typically vanish below the intake 20 before reaching PMM 26. In theory, if PMM 26 generated no heat, there would be no flow past it and the fluid 22 within entire region below the pump intake 20 could be considered static.

However, as discussed herein above the motor generates heat, principally from its active rotor-stator section 201. Heat from PMM 26 warms the stagnant fluid 22 proximate the surface of the motor and the heated fluid rises within annulus 200 represented by flow line 202. This is caused by natural convection. Since the volume below the motor is sealed by casing and cement, rising fluid 202 can only be replenished by cooler fluid (again, mostly water) entering annulus 200 from above the annulus and travelling downwards within the annulus represented by flow line 203. The cooler fluid continues to flow downward 203 to the bottom of the heat generating zone 201. Natural convection of heat transferred from PMM 26 causing upward flow 202 and replenishment flow 203, produces a naturally occurring heat-induced flow circulation. The velocity of flow 202 with typical motors will be much lower than the 1 foot/second described herein above, and usually recommended, for forced convection under a shroud or when the motor is above perforations. It has been discovered that flow 202 of the otherwise torpid fluid 22 nearest to PMM 26 of the present invention will generally have a peak rate of 1-2 inches/second and an average flow rate of approximately half of the peak flow rate.

Still referring to FIG. 5, it should be appreciated that heat transferred from PMM 26 to fluid 22 flowing upward 202 will also warm the fluid 22 flowing downward 203 at an interface between the two flows perhaps with eddies of fluid flowing radially from the motor toward the casing. When downward fluid flow 203 reaches the bottom of the heat generating zone 201, it is warmer than the fluid 22 below the motor and as it turns back to become upward flow 203 the bottom of the motor starts in a warmer environment than pertaining to the initially cooler torpid fluid 22 entering the annuls from the top of the motor and moving down 202. Although described herein as a torpid fluid, torpid fluid 22 does exhibit some flow caused by the aforementioned heat transfer and there are portions of the fluid that rise within the annulus 22, portions that drop within the annulus and portions that remain completely stagnant. Because there are overlapping and mixing among all of the portions the fluid below the perforations it is collectively referred to herein as torpid fluid 22.

It is a conventional perception in prior art motors that the upper part of a motor is the hottest. In the case of present invention operating in stagnant fluid 22, i.e. below perforations 8, with a natural convection flow pattern as described immediately herein above, it has been discovered that the bottom part of the motor 26 becomes hottest and that the upper portion is well cooled by fluid 22 entering annulus 200 from above the motor. In addition to providing sufficient cooling to the motor 26 in general, this discovery has the further benefit of reducing the likelihood of scale formation near the motor head electrical connector (not shown).

Figure 6:
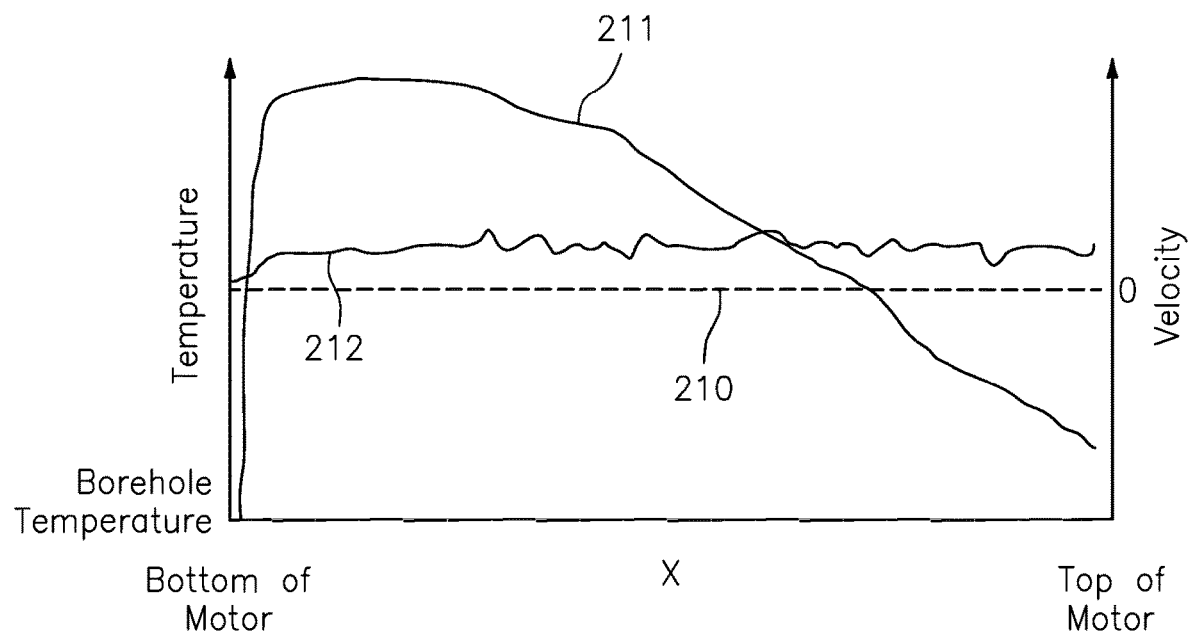
FIG. 6 is graphical representation of the temperature and fluid velocity versus the axial length of a PMM in accordance with the present invention.

Referring now to FIG. 6 there is shown a graphical representation 210 of the axial temperature profile 211 along the length X from the bottom to the top of PMM 26 in FIG. 5 relative to the heat producing zone 201. The axial fluid velocity of stagnant fluid 22 is shown by line 212 along the length X from the bottom to the top of PMM 26. In calculating the relationships shown in FIG. 6, and for the sake of simplicity, the temperature-smoothing characteristic of the motor steel housing has not been taken into account. As can be seen from the figure, the axial temperature profile 211 of PMM 26 first increases and then steadily decreases along its length as described herein above.

Figure 7:
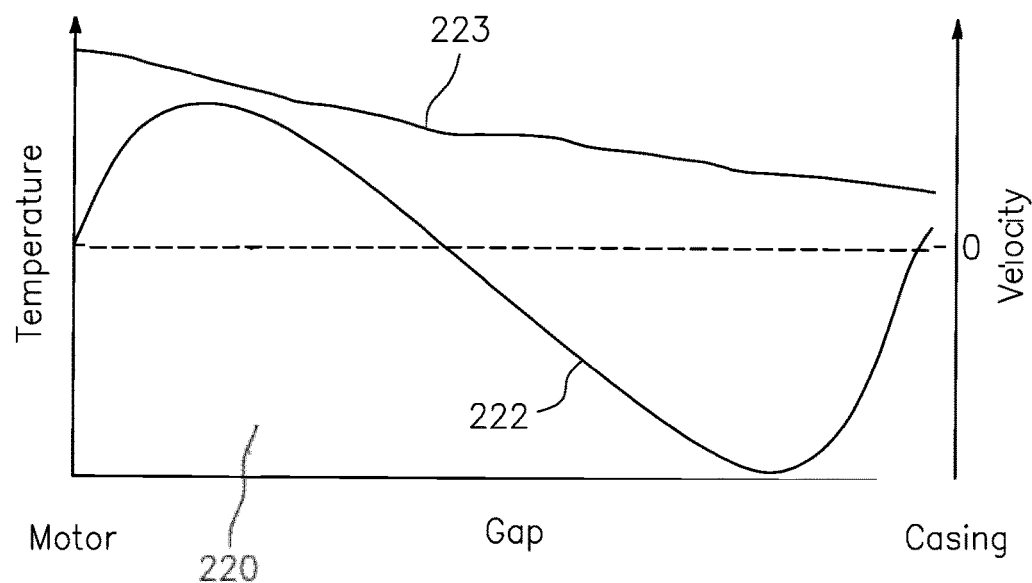
FIG. 7 is graphical representation the radial temperature and fluid velocity profiles from a PMM in accordance with the present invention.

Referring next to FIG. 7 there is shown a graphical representation 220 wherein the x-axis represents the radial distance from the PMM 26 to the casing 3. The temperature of the fluid 22 is represented by line 223 and it shows the decrease in temperature of the fluid as the distance from the motor approaches the casing as discussed herein above. The axial velocity of the fluid 22 (moving up and down the annulus 200) is depicted by line 222. Line 222 represents a positive velocity (upward) near the motor, associated with rising flow 202 in FIG. 5, and further shows a negative velocity (downward) near the casing, associated with downward fluid flow 203 in FIG. 5.

It has further been discovered that the casing 3, cement 7 and formation 6 surrounding the borehole acts as a large insulator. In the foregoing discussion of natural convection it was tacitly assumed that no heat was transferred out to the formation 6. Although due to the formation heat capacity and volume it may take days to weeks of operation of PMM 26 to significantly raise the temperature around the borehole, it is important to appreciate that if heat removal by natural convection is very poor, then heat will enter the formation 6, and eventually the rise in temperature of the casing 3, cement 7 and formation 6 and annulus fluid 200 will be high. As discussed herein above, the naturally occurring flow 202 and 203 may be accompanied by fluid eddies transferring heat across from the PMM 26 to casing 3.

It has been described herein above that the present invention exploits the interaction between the length, diameter, and output of a PMM, along with casing size. It will now be demonstrated that proper selection of the diameter of the PMM 26, with other parameters in mind, yields unexpected benefits in the passive cooling of a PMM located in stagnant fluids. For example, and in accordance to the description of natural convection and FIG. 5, a 3.75 inch diameter PMM 26 may be less than double the length of its 4.56 inch diameter PMM counterpart. In the example of a 5.5 inch 15.5 ppf casing, which is 4.89" inside diameter, the 3.75 inch diameter, PMM when centered, has a radial annular clearance of 0.57 inch compared to similarly situated 4.56 inch diameter motor having a clearance of 0.17 inch. In fact, even if the 4.56 inch motor is fully eccentered in the casing (in contact with the casing itself), its largest gap would still be only 0.33 inch. The significance of these examples is that natural convection is very effective with the 3.75 inch motor, but with the 4.56 inch motor a considerable amount of heat will penetrate into the formation, warming it, and the natural convection movement of fluid 202, 203 will be hampered. These factors will raise the temperature of the PMM compared to a smaller diameter PMM having a larger annular gap. Therefore, it is a further discovery, one that goes against the sense that bigger diameters are always better, that using a smaller diameter PMM below perforations (or in otherwise static flow areas) can result in a lower motor temperature than one which is of maximum usable diameter. This is particularly the case when the length of the larger motor would lead to a very small aspect ratio of annulus clearance to length.

In ESP's using centrifugal or even faster-rotating pumps such as the helico-axial kind, the motor internal oil friction and lamination power losses are significant. These losses increase in proportion to motor length, unlike the copper resistance losses, and set a limit to the reduction in temperature that can be expected from lengthening the motor. They will also impact upon the aspect ratio of the heated annulus 200 and may worsen the convective heat transfer. In contrast, a PCP runs at low speed and the motor internal friction and lamination losses are negligible. For these high torque pumps the full benefit of the present invention motor length scaling may be obtained, and this may allow the use of larger diameter motors with their high torque ratings since the heat required to be removed is less and therefor the gap allowance between the motor and casing may be lessened without an unacceptably detrimental effect on natural convective cooling.

In practice, the selection process for the PMM, for use in portions of a well having torpid fluids, of the present invention includes a thorough computational study of heat transfer and convection such as used to obtain curves 211 and 212 in FIG. 6 and FIG. 7 respectively. Best practices include petrophysical properties of the formation surrounding the motor such as porosity, fluid type and matrix thermal properties. Such a methodology results in an optimum selection of the motor diameter and length of the present invention based on motor internal temperature and economical product selection. This novel method of practice is heretofore unknown in the industry because purposefully forced convection is used to transfer the heat from the motor to the moving fluid and heat transfer into the surroundings can sensibly be ignored.

Example Methods of Employing an Artificial Lift System of the Present Invention

An exemplary method of employing the artificial lift system 25 of the present invention is illustrated with reference to FIG. 8. The illustration of completion 1 is not drawn to scale and is shown as a deviated well, however the present invention is not limited thereto and may be utilized in any known type of fluid producing well. There exists no typical fluid producing well, however many wells have a depth of between 3000 and 10000 feet and have a maximum temperature of between 100° C. and 180° C. After the well is drilled, various components are installed to provide for completion 1. In the embodiment shown, completion 1 includes casing 2 extending from the surface to interface with production liner 3, also commonly referred to as casing, which includes liner hanger 4. Cement 7 is pumped between production liner 3 and the drilled hole to maintain the integrity of the wellbore in a manner well known in the industry. Completion 1 illustrates the use of valves 5 positioned in the producing region of formation 6 behind the perforations or fractures 8. However, completions without valves do not deviate from the scope of the present invention.

The permanent magnet motor pump assembly 25 is shown installed below perforations 8 but may be positioned elsewhere relative to the perforations depending on the particular well and operating environment. PMM pump assembly 25 is comprised of PMM 26 connected to motor protector/seal 16 and pump 12 via rotary shaft 21. Pump 12 is illustrated, by way of example, as a centrifugal pump however it is within the scope of the present invention that other known pump types may be used. PMM 26 is electrically controlled via motor drive 13 and power source 14 mounted at the surface and connected to the PMM via transmission cable 17 (as is known in the prior art). In any case, PMM 26 is shown, by way of example, positioned within stagnant fluid 22 wherein there is little or no flow.

Advantageously, the level of the production fluid 9 will be maintained above the perforations 8 reducing the flowing pressure from formation 6 and increasing the production rate of the well. The production fluid 9 enters the well from the perforations 8 and flows toward pump assembly 25. Production fluid 9 flows towards and enters pump 12 via intake 20 and is pumped to the surface through production tubing 15. PMM 26 is controlled by motor drive 13 to run at an appropriate speed while driving pump 12 to maintain the desired level 40 of production fluid 9. In the case of a centrifugal pump, PMM 26 may nominally rotate at about 3000 rpm. As described herein above, with PMM 26 positioned within stagnant fluid 22 the motor will heat up during use. A naturally occurring convection pattern of fluids will be established as discussed with reference to FIG. 5. Stagnant fluid 22 will come in contact with PMM 26 and passive heat transfer will take place and the fluid will rise within the well bore as it passively gains heat from the motor. When the upwardly rising fluid mixes with cooler fluid above the motor and near seal 16 it will cool and fall downwardly in the wellbore close to casing 3. When the downwardly falling fluid reaches the bottom of PMM 26 the cycle is repeated and a continuous naturally occurring convection cooling pattern is established.

It should be appreciated by those skilled in the art that, in the embodiment of PMM pumping system 25 of FIG. 5, there is no active flow of production fluid 9 past PMM 26, nor is there any other active cooling scheme employed. The borehole may have a diameter 27 of 5.5 inches and may further use of heavy (17 ppf) walled casing 3 which reduces the nominal inside diameter of the well to 4.89 inches. The PMM 26 may have an outside diameter of 3.75 inch leaving about 1.13 inch radial difference between the casing 3 and the motor housing. Although the PMM 26 is shown concentrically located within casing 3 it may be positioned nearest to one side of the casing and would most likely rest against the bottom side of the casing in the embodiment shown.

Figure 8:
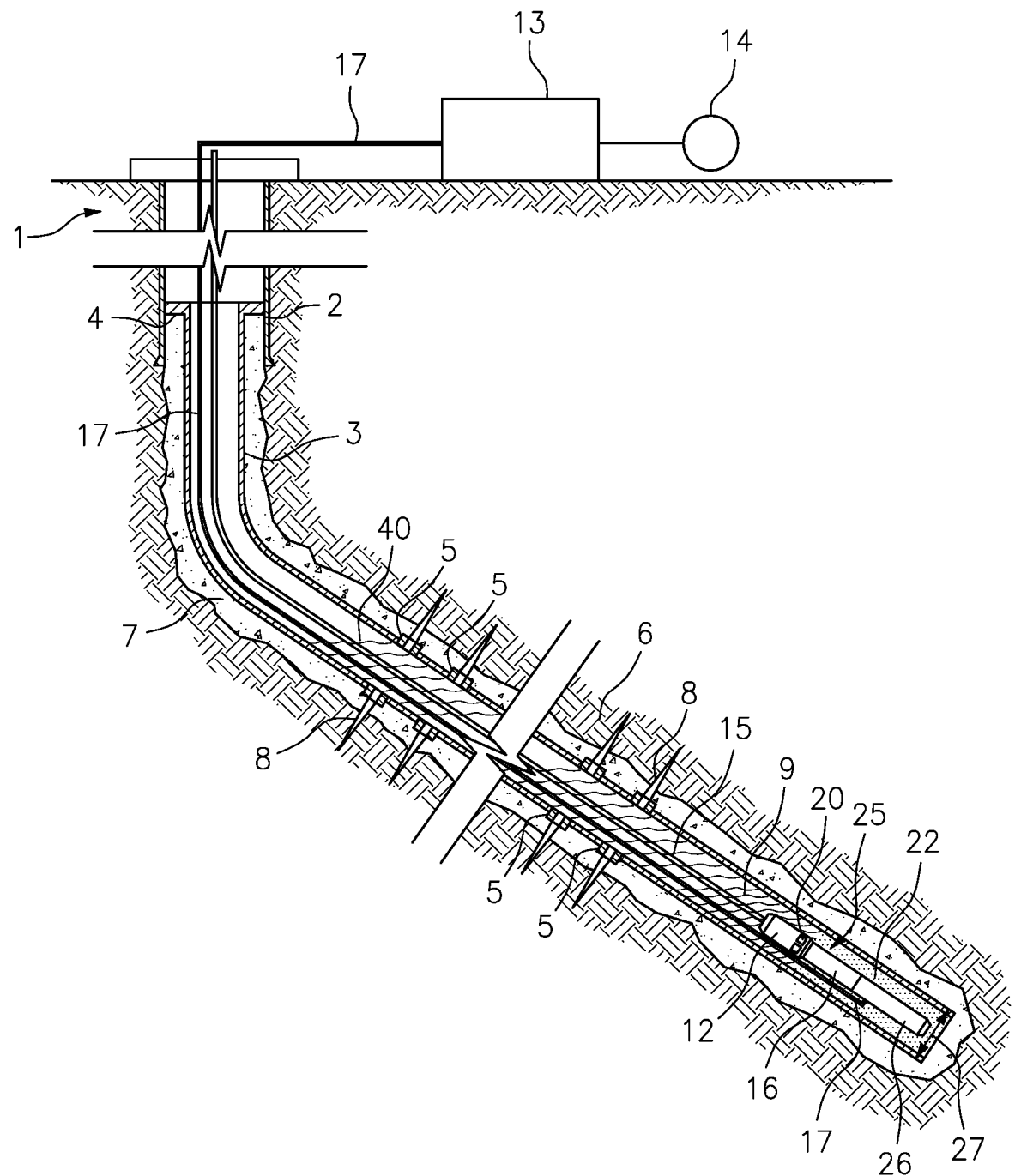
FIG. 8 is representation of an artificial lift system incorporating a PMM pumping system in accordance with the present invention.

As described herein above, with the PMM pump system 25 as shown in FIG. 8, there is no active cooling of PMM 26. It is important to note that PMM 26 of the present invention is positioned in a portion of the wellbore containing substantially torpid or stagnant fluid 22 without diverters or shrouds or other device to produce active cooling for the motor. Instead, the PMM pump system 25 of the present invention relies only on passive cooling of the PMM by the production fluid 9 as is described herein. In operation, the motor will produce heat in the manner described herein above. As described herein above with reference to FIG. 5, as PMM 26 heats up, the torpid, or stagnant, fluid 22 near the motor housing will absorb heat from the motor and rise within the borehole until the heated fluid contacts production fluid above the motor. The heated torpid fluid 22 mixes with the cooler fluid above the motor and subsequently drops within the borehole near casing 3. Thus, a continuous, passive convection pattern is established to cool the PMM 26. It has been discovered that passive convective cooling may be sufficient to keep the PMM 26 below its maximum operating temperature through the interaction between the length, diameter, and output of a PMM, along with casing size and utilizing the relationships and parameters set forth herein above and in FIG. 4 and Equations 5 and 7.

Figure 1:
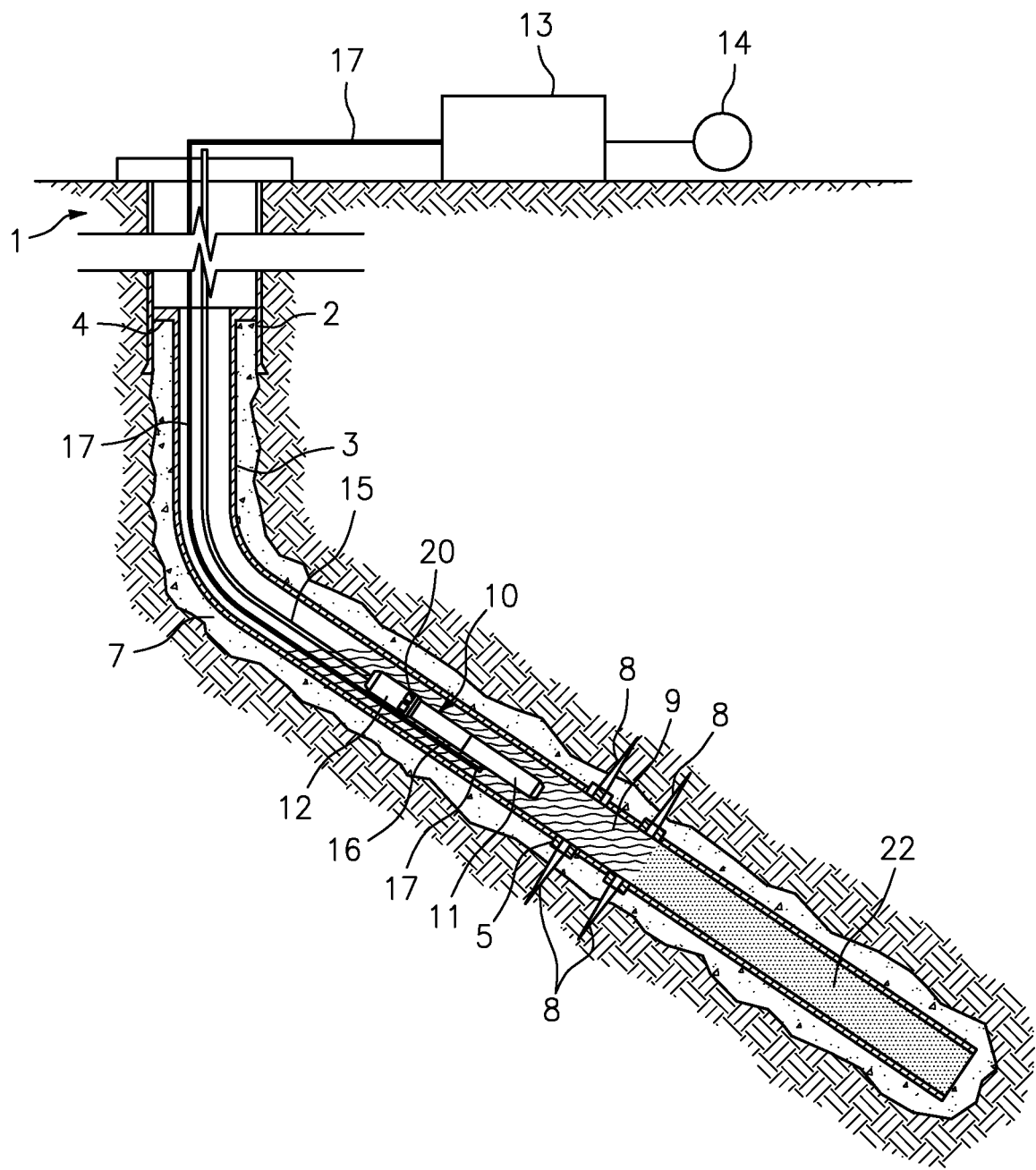
FIG. 1 is representation of an artificial lift system of the prior art showing a pumping system disposed above the perforations.
Figure 2:
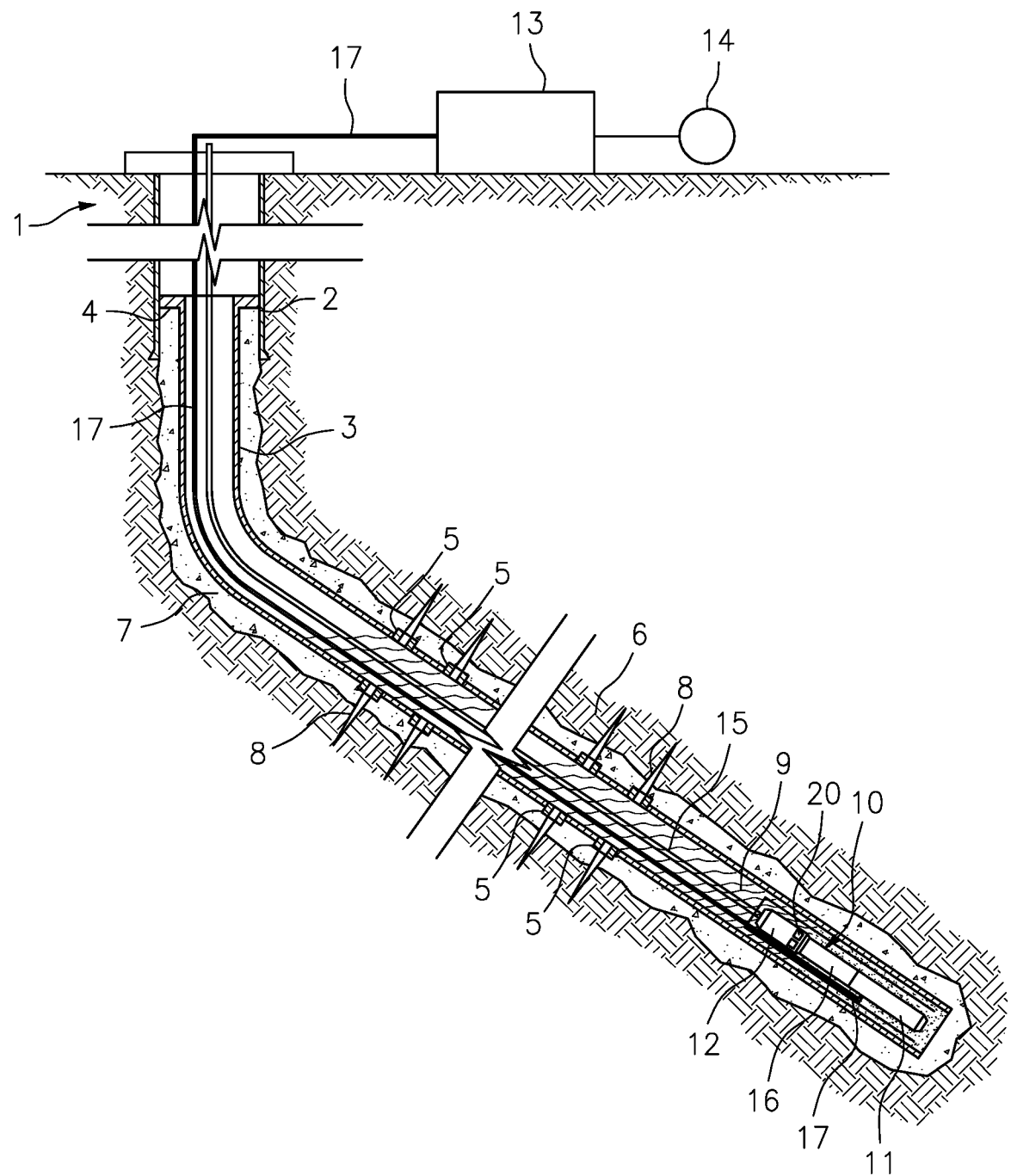
FIG. 2 is representation of an artificial lift system of the prior art showing a pumping system including a shroud.
Figure 9:
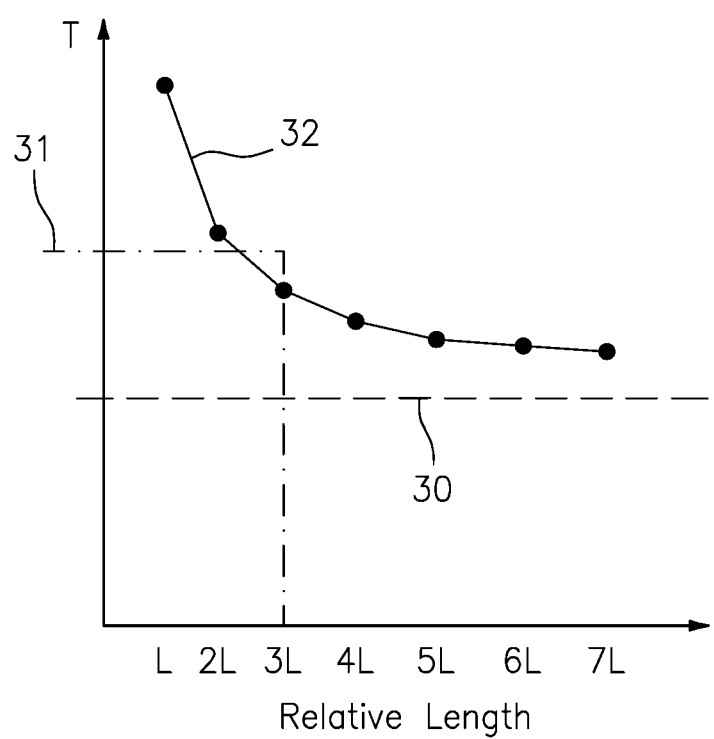
FIG. 9 is graphical representation of the length of a permanent magnet motor versus temperature in accordance with the present invention.

As discussed herein above, the maximum diameter of the PMM may be dictated by the diameter of the well and therefore one parameter that can be changed to assist in cooling the motor is increasing its length. Referring to FIG. 9, line 29 illustrates the cooling of PMM 26 as its heated length is increased in relation to well temperature T. As used herein, the heated length of a PMM refers to the active rotor-stator section 201 (FIG. 5). However, a more precise calculation of temperatures would further include thermally conductive surfaces of the motor assembly along which internal motor heat spreads and wold further be included in what is referred to as the heated length. For example, the motor housing is typically comprised of steel which is a very good conductor of heat, and the heat from the active-rotor section would be conducted along this length. Referring also to FIG. 8, the method of selecting the appropriate motor size begins with determining the well temperature, represented by line 30 (FIG. 9), at, or near, the position of the perforations 8. The nominal length of the motor may be established as if good active cooling were taking place, for example if the PMM 26 were mounted above the perforations 8 as motor 11 is shown in the embodiment of FIG. 1. As described herein above, in such a configuration, the production fluid 9 flows past the motor to the inlet of the pump to provide active cooling to the motor and that motor would have a heated length of L. The maximum operating temperature of PMM 26 is depicted in FIG. 9 as line 31. The PMM 26 is then analyzed as described herein above to determine at what length the motor would be required for it to operate below its maximum operating temperature given only passive convective cooling within a portion of the well where there is very little flow. This relationship is shown as line 32. The embodiment depicted in FIG. 9 shows that the PMM 26 would have a factor k of 3 (from FIG. 4. and Equation 7), or its heated length L is three times longer than the PMM would be if there were active cooling.

Although the example above is directed as selecting the length of PMM 26, the interaction between the length, diameter, and output of a PMM, along with casing size affect the heat transfer performance of the present invention. For instance, in a well of a given casing diameter, a PMM having a diameter of 3.75 inches with a longer length may result in better passive cooling performance than a PMM having a diameter of 4.56 inches with a shorter length. Referring again to FIG. 9, it should be appreciated by those skilled in the art that as the diameter of the PMM of the present invention is advantageously scaled, as described herein before, that the shape and position of line 32 would be characteristically different for larger diameter motors with respect to smaller diameter motors for the same diameter casing.

Utilizing the example given herein above for a 3.75 inch 90 HP PMM mounted above the perforations 8 (or otherwise having active cooling), the overall length of the PMM would be 11.4 feet. In accordance the present invention, and utilizing the relationship shown in FIG. 6, the PMM 26 of the PMM pump assembly 25 would be 30.5 feet overall to include a stator of three times the heated length. As discussed herein above, the lengthening of a motor adversely affects reliability, as well as other practical factors, however 30.5 feet is well within the industry acceptable limits for the length of an ESP motor as, from a pragmatic standpoint, it can be manufactured in a single housing. A corresponding induction motor would need to be 90 feet, made of three full length housings, but would still have inferior thermal performance and it may still overheat.

While the foregoing is directed to embodiments of the present invention, other and further embodiments of the invention may be devised without departing from the basic scope thereof, and the scope thereof is determined by the claims that follow.

What is claimed is:

1. A method for positioning a pumping system in a well, the well comprising perforations, the method comprising:
   selecting a position in the well below a lowest perforation;
   selecting a pump having an intake and further having an operating torque at the position;
   positioning the intake at or below the position;
   positioning a motor having a heated length below the pump;
   selecting a motor capable of producing a motor torque at least two times the operating torque; and
   providing no active cooling scheme to cool the motor;
   relying solely on passive cooling to cool the motor;
   determining a rated current $I_n$ of the motor at a maximum torque;
   determining a motor current I at the operating torque of the pump; and
   determining the heated length of the motor using a ratio of the rated current divided by the motor current 2. The method of claim 1 wherein $$\frac{I_n}{I} \geq 2.$$

3. The method of claim 2 wherein the selecting the motor step further comprises selecting a heated length to passively dissipate heat such that the motor is maintained below a maximum operating temperature at a well temperature below the position.

4. The method of claim 1 wherein the well includes a casing having a casing diameter, the method further comprising selecting a motor diameter less than then the casing diameter to maintain a predetermined gap allowance between the motor and the casing.

5. The method of claim 1 wherein the motor is a permanent magnet motor.

* * * * *